United States Patent
Gupta

(10) Patent No.: US 11,511,234 B2
(45) Date of Patent: Nov. 29, 2022

(54) VACUUM FILTRATION SYSTEM

(71) Applicant: Nalini K Gupta, Ambala Cantt (IN)

(72) Inventor: Nalini K Gupta, Ambala Cantt (IN)

( * ) Notice: Subject to any disclaimer, the term of this patent is extended or adjusted under 35 U.S.C. 154(b) by 488 days.

(21) Appl. No.: 15/558,734

(22) PCT Filed: Apr. 13, 2016

(86) PCT No.: PCT/IB2016/052093
§ 371 (c)(1),
(2) Date: Sep. 15, 2017

(87) PCT Pub. No.: WO2016/166673
PCT Pub. Date: Oct. 20, 2016

(65) Prior Publication Data
US 2018/0078906 A1 Mar. 22, 2018

(30) Foreign Application Priority Data
Apr. 16, 2015 (IN) .......................... 1070/DEL/2015

(51) Int. Cl.
*B01D 65/08* (2006.01)
*B01D 61/18* (2006.01)
(Continued)

(52) U.S. Cl.
CPC ......... *B01D 65/08* (2013.01); *B01D 19/0031* (2013.01); *B01D 61/18* (2013.01);
(Continued)

(58) Field of Classification Search
None
See application file for complete search history.

(56) References Cited

U.S. PATENT DOCUMENTS 2,761,813 A * 9/1956 Goetz ..................... C12M 23/44
435/297.5
3,762,564 A * 10/1973 Weedon ................. B01D 29/58
210/446
(Continued)

FOREIGN PATENT DOCUMENTS

CN 202893032 4/2013
GB 498139 1/1939
(Continued)

OTHER PUBLICATIONS

Three (3) pages of International Search Report issued in PCT/IB2016/052093 dated Jul. 22, 2016.

*Primary Examiner* — Jonathan M Peo
(74) *Attorney, Agent, or Firm* — D'Ambrosio & Menon, PLLC; Usha Menon

(57) ABSTRACT

The present disclosure relates to a vacuum filter that incorporates a large area pleated filter element having pleated hydrophilic membrane configured along slanting surface in pyramid shape and incorporated with in a filter housing that can be accommodated in neck of a filtrate container. The disclosed configuration reduces overall height of the filtering system improving its stability and reducing space requirement. Further, top portion of the filter housing is configured to receive either a feed cup for direct feeding of feed liquid by pouring in the cup or a fitting with tube that can be used to suck the feed from a feed solution container under action of a vacuum thus allowing universal use. In another embodiment, a single hydrophobic membrane is provided to avoid problems of low flow due to bubbles coming with the feed solution and also to allow restart of filtration without air lock.

9 Claims, 3 Drawing Sheets

(51) Int. Cl.
  *B01D 63/06* (2006.01)
  *B01D 19/00* (2006.01)
  *B01D 63/14* (2006.01)
  *B01D 69/02* (2006.01)
(52) U.S. Cl.
  CPC .......... *B01D 63/067* (2013.01); *B01D 63/14* (2013.01); *B01D 69/02* (2013.01); *B01D 2313/16* (2013.01); *B01D 2313/24* (2013.01); *B01D 2321/2008* (2013.01); *B01D 2325/36* (2013.01); *B01D 2325/38* (2013.01)

(56) References Cited

U.S. PATENT DOCUMENTS

| | | | | |
|---|---|---|---|---|
| 4,066,512 | A * | 1/1978 | Lai | B01D 69/144 435/10 |
| 4,459,139 | A * | 7/1984 | vonReis | A61M 5/385 210/416.1 |
| 4,673,501 | A | 6/1987 | Wells Jr. et al. | |
| 4,689,147 | A * | 8/1987 | Leoncavallo | B01D 29/05 210/232 |
| 4,806,135 | A * | 2/1989 | Siposs | A61M 1/3627 210/304 |
| 5,141,639 | A * | 8/1992 | Kraus | B01D 61/18 210/321.75 |
| 5,603,900 | A * | 2/1997 | Clark | B01D 29/012 422/535 |
| 5,618,425 | A * | 4/1997 | Mitamura | A61M 1/3627 210/493.5 |
| 2004/0188344 | A1* | 9/2004 | Scott | B01D 61/16 210/406 |
| 2010/0237017 | A1* | 9/2010 | Maiden | B01D 29/085 210/660 |
| 2010/0307967 | A1* | 12/2010 | Clark | B01D 61/08 210/291 |
| 2014/0076792 | A1* | 3/2014 | Pierik | C02F 1/002 210/321.64 |

FOREIGN PATENT DOCUMENTS

| | | | | |
|---|---|---|---|---|
| GB | 1479226 | * | 7/1977 | ............ B01D 29/21 |
| GB | 1479226 | | 7/1997 | |
| WO | 0047310 | | 8/2000 | |

* cited by examiner

VACUUM FILTRATION SYSTEM

TECHNICAL FIELD

The present disclosure generally relates to the field of vacuum filter devices that filter liquids from one container through a membrane and deposit the filtrate directly into another container. More particularly, the invention relates to a filtering device that comprises pyramid shaped large area pleated filter element and ensures unimpaired filtration.

BACKGROUND

Background description includes information that may be useful in understanding the present invention. It is not an admission that any of the information provided herein is prior art or relevant to the presently claimed invention, or that any publication specifically or implicitly referenced is prior art.

It is often necessary to filter fluids in laboratories rapidly and without risk of leakage and contamination. This is especially true for biological solutions such as tissue culture media, additives etc. which need to be sterilized before use. Although large area pressure driven devices are available for use in labs but they are difficult to use as these require assembly of tubes and clamps in addition to set up of peristaltic pumps and pressure gauges etc.

The Bottle Filter described in European Patent 0321-064 A1 consists of separately fabricated funnel, filter membrane disc and adapter. The membrane is secured on the bottom wall of the funnel. An adapter secured to the downstream side of the membrane is mounted directly on the bottle. When vacuum is applied to the nipple on the adapter, the liquid in the funnel is filtered into the bottle.

U.S. Pat. Nos. 4,689,147 and 4,702,834 disclose biological filter assemblies consisting of a container for unfiltered feed liquid, a container for filtrate and membrane disc secured in between the two containers. While the above patents describe convenient ways of filtering biological solutions, there are a number of drawbacks. Such as, above assemblies are very bulky increasing the packaging, transportation and storage costs. Further, filling the feed liquid container is inconvenient specially when the volume of filtrate container is large and the feed funnel has to be refilled again and again. A large container is very difficult to lift again and again for pouring the solution in feed funnel.

U.S. Pat. No. 5,141,639 addresses the above problems by providing a bottle cover with filter, attachable to the filtrate container and a feed nipple for attachment to feed tube for dipping in feed liquid container. Additionally a vacuum port is located in the bottle cover to provide vacuum to the filtrate bottle. To avoid problems of blockage by accidental air bubbles and when restarting the filtration, portions of the hydrophilic filter membrane is made hydrophobic. U.S. Pat. No. 7,806,274B2 uses a hydrophilic membrane but provides a curved dome shape of the top of housing to accumulate air bubbles in the dome.

The major drawback of above bottle top filters is that because of small area and further reduction in area due to hydrophobic zones, the membrane filter gets choked quickly. The air bubbles are not easily removed from the membrane surface because these bubbles tend to stay over hydrophilic zones since the flow over the filter surface is not turbulent. The dome does not answer the problem of air lock experienced due to bubble point phenomena of wet membranes, on renewed start of filtration.

U.S. Pat. No. 6,623,631 B1 describes a cartridge like pleated filter element enclosed in a cylindrical housing to form an inlet chamber with inlet fitting connected to the feed container. The outlet of the filter element is in communication with the filtrate container. In addition a hydrophobic membrane is sealed at the upper end cap of the cartridge like filter element as also another in the top portion of the inlet chamber. This device gives high flow rates but cannot be used with a feed cup. It also suffers from high cost of manufacture due to several hydrophobic membranes required to be sealed at various angles to make the device.

There is therefore need in the art of a universal large area vacuum filtration device which is not bulky and can be used with a feed cup or a tube assembly without risk of air lock of filter surface by bubbles coming with the solution to be filtered and which allows unimpaired filtration even in case of renewed startup of filtration by vacuum.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling with in the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description used in the appended claims.

OBJECTS OF THE INVENTION

An object of the present disclosure is to overcome problems associated with conventional vacuum filters.

Another object of the present disclosure is to provide a device with a filtering element that has large filtration area.

Another object of the present disclosure is to provide a universal device which can be used with a feed cup or a tube assembly as required.

Another object of the present disclosure is to provide a solution that reduces the size of the device and minimizes packaging, transportation and storage costs.

Another object of the present disclosure is to provide a filtering cup that can be stacked over each other thus reduce storage space and transportation cost.

Another object of the invention is to minimize number of hydrophobic membranes without increasing risk of air lock by air bubbles and to have unimpaired filtration even in case of renewed startup of filtration.

Another object of the invention is to reduce the production costs of the vacuum filtration system.

Another object of the present disclosure is to reduce overall height and thus improve the mechanical stability of the total system.

Another object of the invention is to provide a device which allows air bubbles to move up and away from the filter surface so that there is no blockage of filter surface.

SUMMARY

Aspects of present disclosure relate to a vacuum filter that incorporates a large area pleated filter element configured with in a filter housing (also referred to as housing and the two terms used interchangeably hereinafter) that can be accommodated in neck of a filtrate container (also referred to as bottle and the two terms used interchangeably hereinafter). In an aspect the disclosed configuration reduces the size (overall height) of the filtering system improving its stability and reducing space requirement.

In an aspect, the filter element can be pyramid shaped with the membrane placed along slanted surface of the pyramid to enable movement of air bubbles in vertically up direction and prevent their accumulation on its surface. Thus the filter element can provide a large surface area within a limited diameter of the filter housing that is configured to be accommodated with in the neck of the filtrate container. In an embodiment the pyramid can have a circular, regular polygon, irregular polygon, rectangular or any other suitable cross section to suit the space available and can be a full pyramid having a base and an apex or a truncated pyramid having a larger lower base and a smaller upper base of complimentary shapes so that the largely vertical membrane has a sloping surface to prevent accumulation of air bubbles as now they are free to move vertically up. In the preferred embodiment illustrated in the disclosure, the filter element is configured in a truncated conical shape with a larger circular base and smaller upper part.

In an embodiment, the filtrate container can be reusable and only the filter housing incorporating the large area filter element needs to be shipped to users reducing the bulk very significantly thereby bringing in considerable cost benefits.

In an embodiment, top portion of the filter housing is configured to receive either a feed cup (without any filter) for direct feeding of feed liquid by pouring in the cup or a fitting with tube that can be used to suck the feed from a feed solution container under action of a vacuum applied to the system and feed the feed liquid to the filtering system thus allowing universal use.

In an embodiment, the upper part of the wall of the filter housing can be configured with one hydrophobic membrane sealed such that there is no flow of liquid through it at applied vacuum. When the filter housing is sealed on the mouth of a bottle/filtrate container, the space inside the filter housing can be in gaseous communication with the space in the filtrate container through the hydrophobic membrane allowing removal of air bubbles coming with the feed solution. It also allows restart of filtration without impairment due to airlock. This construction allows air path from upstream of filter to the filtrate container through a single hydrophobic membrane which is enough to avoid problems of low flow due to bubbles coming with the feed solution and also to allow restart of filtration without air lock.

In an embodiment, the feed cup is configured such that a number of them can be stacked to minimize the space requirement during storage and transportation. In an aspect as the feed cup does not contain the filter element, it is possible to ship and store them in stacked condition resulting in reduced bulk volume and consequent lower packaging, transportation and storage costs.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1:
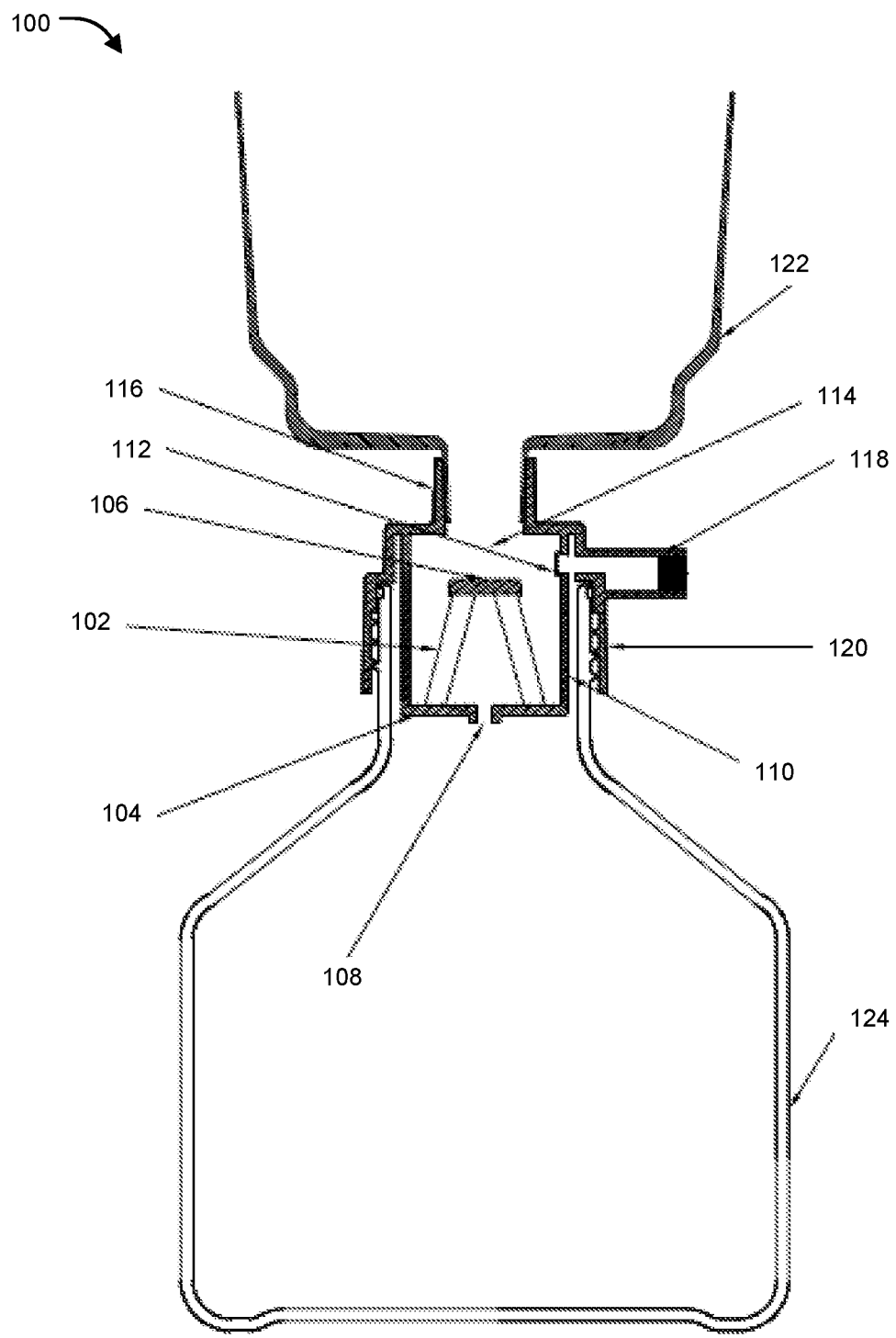
FIG. 1 illustrates an exemplary schematic diagram of vacuum filtration system in use with a cup in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments;

on the contrary, the intention is to cover all modifications, equivalents, and alternatives falling with in the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Various terms as used herein are shown below. To the extent a term used in a claim is not defined, it should be given the broadest definition persons in the pertinent art have given that term as reflected in printed publications and issued patents at the time of filing.

Embodiments of the present disclosure relate to a vacuum filter assembly that incorporates a large area pleated filter element made of a hydrophilic membrane housed within a filter housing that can be accommodated in neck of a filtrate container. In an aspect the disclosed configuration reduces the size (overall height) of the filtering system improving its stability and reducing space requirement.

In an embodiment, the membrane in the filter element can be arranged along slanting walls of a pyramid, wherein the slanted position of the membrane allows movement of air bubbles in vertically up direction and prevent their accumulation on its surface. Furthermore, pyramid shape enables accommodating a large surface area of the membrane with in limited diameter of the filter housing which can in turn be accommodated with in neck of the filtrate container.

In an embodiment, the pyramid can have a circular, regular polygon, irregular polygon, rectangular or any other suitable cross section to suit shape and available space and can be a full pyramid having a base and an apex or a truncated pyramid having a larger lower base and a smaller upper base of complimentary shapes so that the largely vertical membrane has a sloping surface. In an aspect, the slanted/sloping surface prevents accumulation of air bubbles and enables them to move vertically up. In the preferred embodiment illustrated in the disclosure, the filter is a large surface area pleated filter element which is configured in a truncated conical shape with a larger circular base cap and smaller upper cap.

In an embodiment, top portion of the filter housing can be configured to receive a fitting selected from a group comprising a feed cup and a fitting with tube. In an embodiment, the feed cup can be used for direct feeding of feed liquid by pouring in the cup. In another embodiment, the fitting with tube can be used to suck the feed from a feed solution container under suction of a vacuum applied to the system and feed the feed liquid to the filtering system. Thus the disclosed filter assembly allows universal use.

In an embodiment, the upper part of the wall of the filter housing can be configured with a hydrophobic membrane sealed such that there is no flow of liquid through it at applied vacuum. When the filter housing is sealed on the mouth of a bottle/filtrate container, the space inside the filter housing is in gaseous communication with the space in the filtrate container through the hydrophobic membrane allowing removal of air bubbles coming with the feed solution. This construction allows air path from upstream of filter to the filtrate container by one hydrophobic membrane which is enough to avoid problems of low flow due to bubbles coming with the feed solution and also allows restart of filtration without air lock. Using only one hydrophobic membrane results in lower cost of production.

In an embodiment, the feed cup is configured for stacking one over other and therefore a number of them can be stacked to minimize space requirement during storage and transportation. In an aspect as the feed cup does not contain the filter element, it is possible to ship and store them in stacked condition resulting in reduced bulk volume and consequent lower packaging, transportation and storage costs. In another embodiment, the filtrate container can be reusable and only the filter housing incorporating the large area filter element needs to be shipped to users reducing the bulk very significantly thereby bringing in considerable cost benefits.

Referring now to FIG. 1 wherein an exemplary schematic diagram 100 of the disclosed vacuum filtration assembly with a feed cup is disclosed. Shown therein is a pleated filter element 102 configured with in a filter housing 110. The filter element 102 can be configured to have a hydrophilic membrane in shape of a pyramid. The pyramid can have a cross section of circular, regular or irregular polygon, rectangular or any other suitable shape to suit the available space of the housing 110. Further, it can be a full pyramid having a base and an apex or a truncated pyramid having a larger lower base 104 and a smaller upper part 106 of complimentary shapes so that the largely vertical membrane has a sloping surface to prevent accumulation of air bubbles and enable them move vertically up. In the preferred embodiment illustrated in the diagram 100, the filter element is a large area pleated filter device of a conical shape with a larger circular lower base cap 104 and smaller circular upper cap 106. The larger lower base cap 104 incorporates a hole 108 so that filtrate passing through the filter 102 can move directly into the filtrate container/bottle 124.

In an embodiment, the disclosed configuration of the filter element 102 enables to provide a filter element 102 with a large surface area within a limited diameter of the filter housing 110 that is configured to be accommodated with in the neck of the filtrate container 124. The housing 110 can incorporate means to facilitate sealing of the filter housing 110 with in the neck of the filtrate container 124 such as but not limited to threaded cap 120 as shown in the exemplary embodiment. In an aspect the disclosed configuration reduces the size (overall height) of the filtering system improving its stability and reducing space requirement.

In an embodiment, the filtrate container can be reusable and only the filter housing incorporating the large area filter element needs to be shipped to users reducing the bulk very significantly thereby bringing in considerable cost benefits.

In an embodiment, the filter housing 110 can incorporate a tubular opening 118 for connection to a vacuum generating device (not shown here). The tubular opening 118 can be in gaseous communication with inside of the filtrate container 124 such that vacuum generated by the vacuum generating device develops vacuum in the filtrate container 124. The generated vacuum can induce suction of filtrate through the filter 102 and speed up the filtering process.

In an embodiment, the upper part of the wall of the filter housing 110 can be configured with a hydrophobic membrane 112 sealed such that there is no flow of liquid through it at applied vacuum. When the filter housing 110 is sealed on the mouth of a bottle/filtrate container 124, the space 114 inside the filter housing 110 can be in gaseous communication with the space in the filtrate container through the hydrophobic membrane 112 allowing removal of air bubbles coming with the feed solution which can get removed under suction of vacuum in the filtrate container. This construction allows air path from upstream of filter to the filtrate container by a single hydrophobic membrane 112 which is enough to avoid problems of low flow due to bubbles coming with the feed solution and also to allow restart of filtration without air lock.

In an embodiment, top portion 116 of the filter housing 110 can be configured to receive either a feed cup 122 (without any filter) for direct feeding of feed liquid by pouring in the feed cup 122 or a fitting with tube (not shown in FIG. 1 and explained in FIG. 3) that can be used to suck the feed from a feed solution container whether a hard container or a flexible bag, under suction of a vacuum applied to the system and feed the feed liquid to the filtering system thus allowing universal use.

Figure 2:
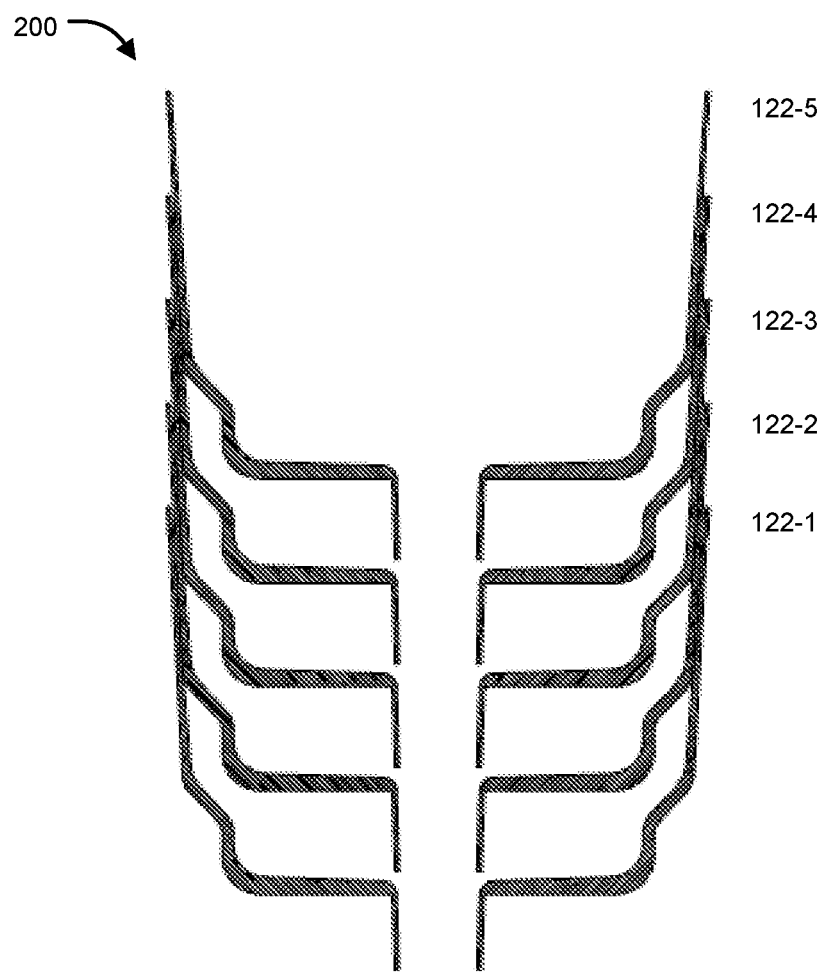
FIG. 2 illustrates an exemplary schematic diagram of stacked filter cups that minimizes bulk of the filter assembly in accordance with an embodiment of the present disclosure.

FIG. 2 illustrates an exemplary schematic diagram 200 of stacked feed cups 122 that minimizes bulk of the filter assembly in accordance with an embodiment of the present disclosure. The feed cup 122 is configured such that a number of them such as 122-1, 122-2, 122-5 can be stacked to minimize the space requirement during storage and transportation. In an aspect as the feed cup 122 does not contain any filter element, it is possible to ship and store them in stacked condition resulting in reduced bulk volume and consequent lower packaging, transportation and storage costs.

Figure 3:
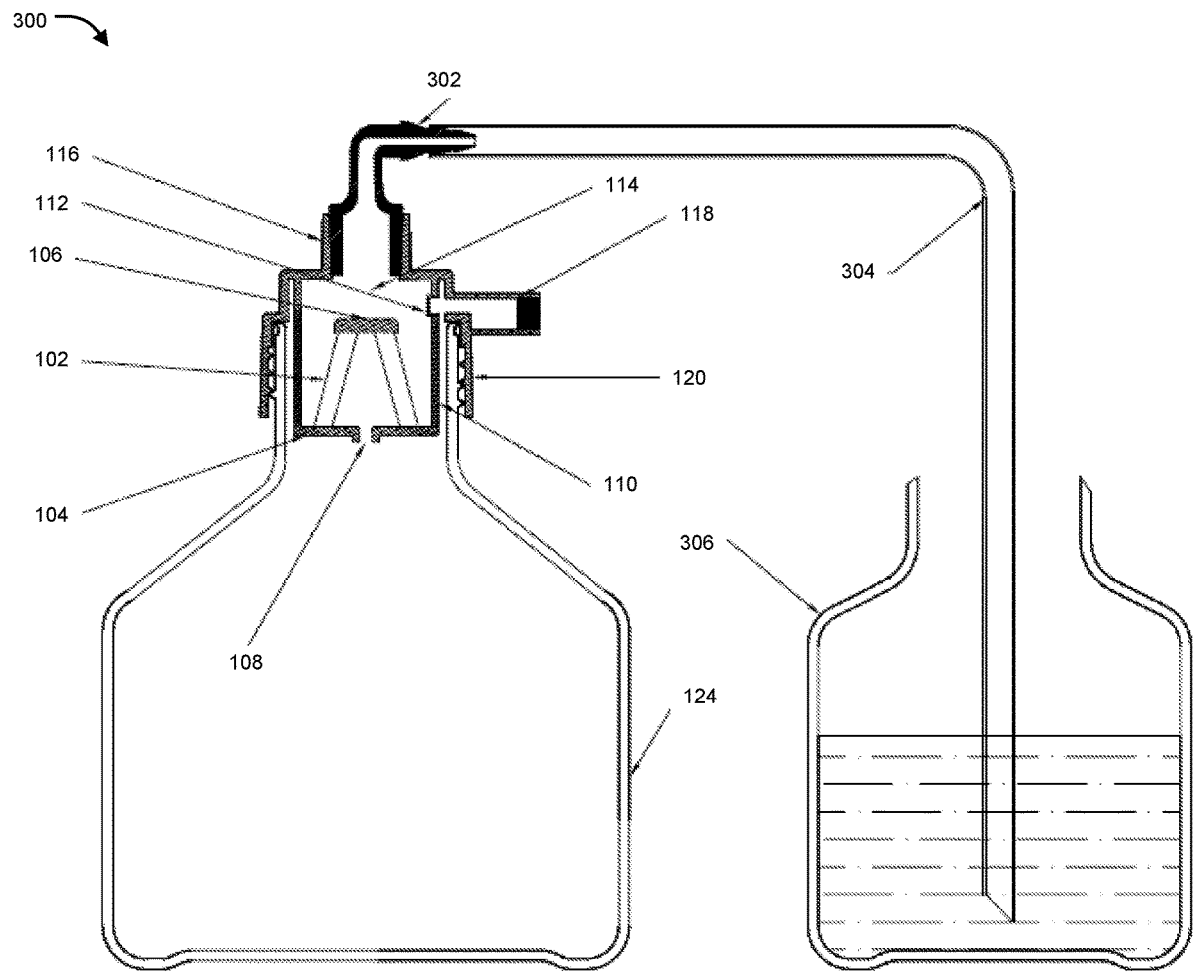
FIG. 3 illustrates an exemplary schematic diagram of the vacuum filtration system assembly in use with a tube feed by dipping the tube in the feed fluid container in accordance with embodiments of the present disclosure.

FIG. 3 illustrates an exemplary schematic diagram 300 of the vacuum filtration system assembly with a tube feed by dipping the tube in the feed fluid container in accordance with embodiments of the present disclosure. As shown the top portion 116 of the filter housing 110 can be configured with a feed fitting 302 in place of a feed cup 122 (FIG. 1). The feed fitting 302 can in turn be connected to a tube 304 which is dipped in feed liquid contained in a container 306. On application of vacuum, air can be driven out of filtrate container 124 and also space 114 due to both the dry hydrophilic filter 102 as well as hydrophobic membrane 112. This causes immediate suction of the feed fluid into space 114 and consequent filtration of the fluid into the filtrate container 124. Any air bubbles coming with the liquid tend to accumulate near the top portion of space 114 due to slanting shape of the filter element, where they do not hinder the filtration or can be removed from space 114 through the hydrophobic membrane 112 into the filtrate container 124. On restart of filtration, even though there may be no vacuum applied through the wetted filter element 102, due to well-known bubble point phenomenon, space 114 can get evacuated through the hydrophobic membrane 112 assuring an unimpaired restart of filtration process. Thus a single hydrophobic membrane 112 can effectively remove the air bubbles during filtering process and also help in restarting the filtration without any hindrance as against more than one membranes used in prior art for meeting these functional requirement thus reducing the cost of the membrane used in the system as well as cost of production bringing corresponding cost benefit to users.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

ADVANTAGES OF THE INVENTION

The present disclosure overcomes problems associated with conventional vacuum filters.

The present disclosure provides a device with a filtering element that has large filtration area and due to its slanting shape allows movement of air bubbles away from the membrane surface resulting in higher flow and higher filtration efficiency.

The present disclosure provides a universal device which can be used with a feed cup or a tube assembly connected to a hard container or a flexible bag.

The present disclosure provides a solution that reduces the size of the device and minimizes packaging, transportation and storage costs.

The present disclosure provides a filtering cup that can be stacked over each other thus reducing storage space and transportation cost.

The invention minimizes number of hydrophobic membranes without increasing risk of reduced flow by air bubbles and have unimpaired filtration even in case of renewed startup of filtration without the risk of air lock.

The invention reduces the production costs of the vacuum filtration system.

The present disclosure reduces overall height and thus improves the mechanical stability of the total system.

I claim:

1. A vacuum filter assembly for filtering a feed liquid into a filtrate container, the vacuum filter assembly comprising:
a filter housing configured to be accommodated within a neck of the filtrate container; and a filter element made of a membrane and configured within the filter housing;
wherein the filter element is of a conical shape to enable movement of air bubbles in a vertically up direction and prevent accumulation of the air bubbles on a surface of the membrane;
wherein the filter housing incorporates an opening configured such that when the vacuum filter assembly is fitted on the filtrate container, the opening is in gaseous communication with an inside of the filtrate container, and wherein the opening is used for applying a vacuum to the filtrate container and induce suction of the feed liquid through the filter element into the filtrate container; and
wherein the filter housing incorporates a single hydrophobic membrane located on an intake side of the filter housing such that when the vacuum filter assembly is fitted on the filtrate container, the single hydrophobic membrane provides a direct air path from upstream of the membrane of the filter element to the inside of the filtrate container to enable the vacuum to remove the air bubbles coming with the feed liquid from the intake side of the filter housing before the air bubbles reach an intake side surface of the filter element to prevent blockage of the surface of the membrane due to the air bubbles, and also to restart vacuum filtration without impairment due to air lock.

2. The vacuum filter assembly of claim 1, wherein the filter element is a large area pleated filter element formed of the membrane that is a hydrophilic membrane.

3. The vacuum filter assembly of claim 1, wherein the conical shape of the filter element is a truncated conical shape.

4. The vacuum filter assembly of claim 1, wherein a base of the conical shape of the filter element incorporates a hole to enable filtrate passing through the membrane to move to the filtrate container.

5. The vacuum filter assembly of claim 1, wherein the filter housing is configured to receive direct feeding of the feed liquid by pouring in a feed cup.

6. The vacuum filter assembly of claim 5, wherein the feed cup is configured to enable stacking.

7. The vacuum filter assembly of claim 1, wherein the filter housing is configured to receive a fitting with a tube to suck the feed liquid from a hard container or a flexible bag under action of the vacuum.

8. The vacuum filter assembly of claim 1, wherein the filter housing incorporates a threaded cap that fits and seals the filtrate container while the filter housing is located within the neck of the filtrate container.

9. The vacuum filter assembly of claim 8, wherein the threaded cap is integral to the filter housing.

\* \* \* \* \*